Patented Jan. 23, 1923.

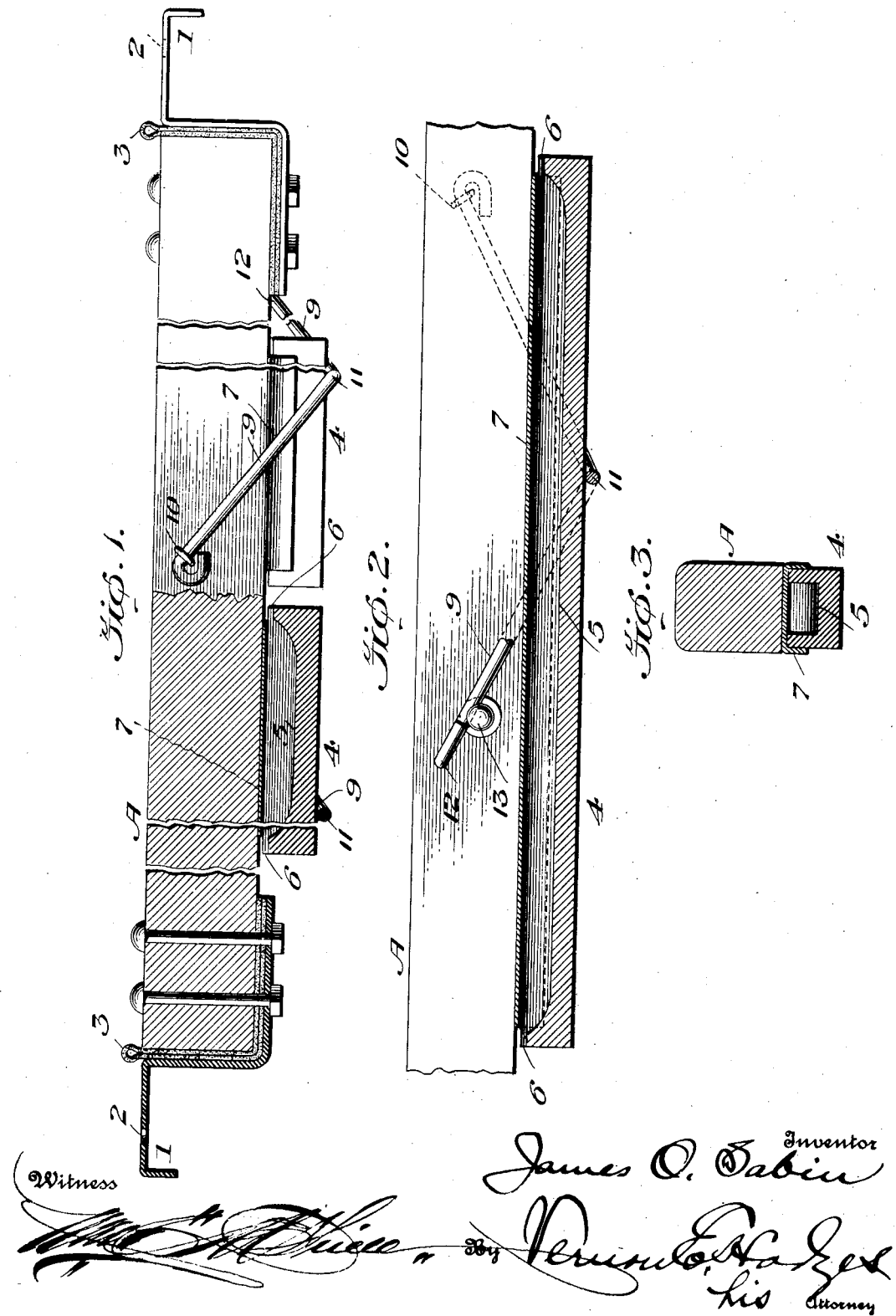

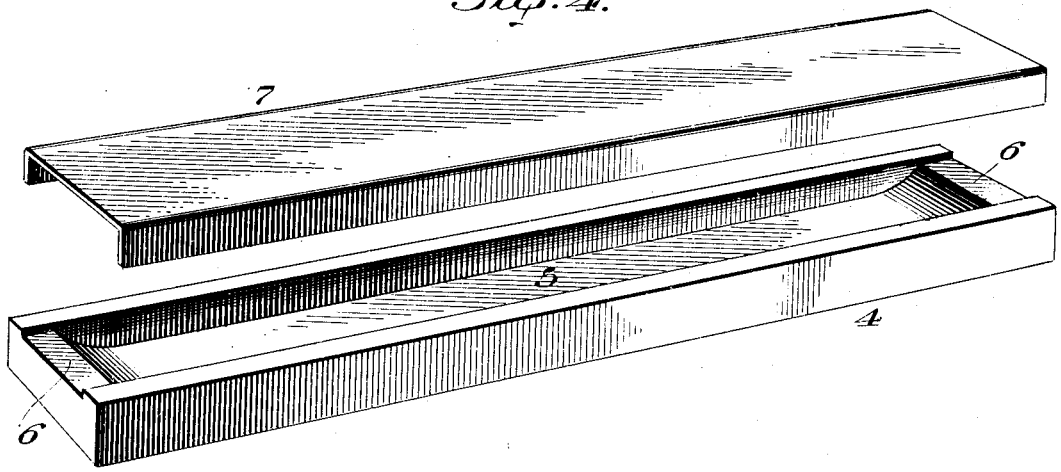
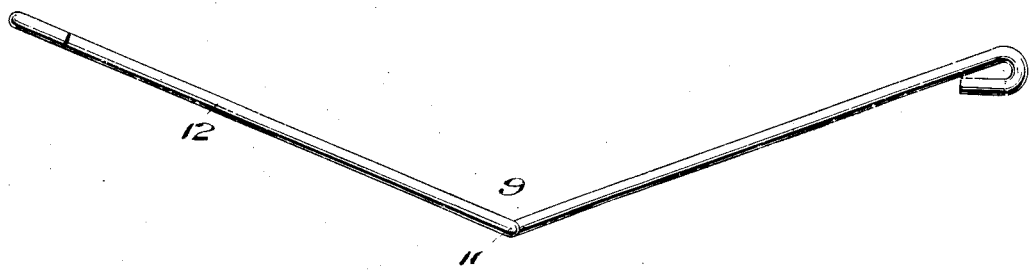
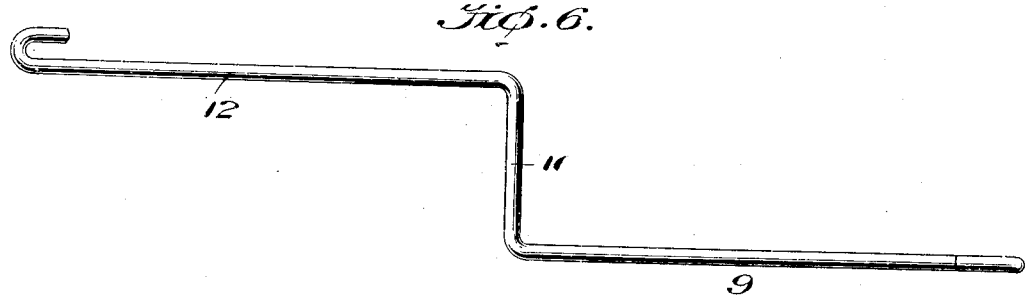

1,443,278

UNITED STATES PATENT OFFICE.

JAMES O. SABIN, OF WAPELLO, IOWA.

POULTRY ROOST.

Application filed November 6, 1919. Serial No. 336,148.

*To all whom it may concern:*

Be it known that I, JAMES O. SABIN, a citizen of the United States, residing at Wapello, in the county of Louisa and State of Iowa, have invented certain new and useful Improvements in Poultry Roosts, of which the following is a specification.

My invention relates to an improvement in poultry roosts, and the object is to provide a simple and effectual means for trapping, catching and removing lice and mites therefrom.

The invention consists in removable traps to receive the vermin, and means for detachably fastening said traps to the roosts.

The invention further consists in a particular form of spring fastening for detachably but firmly holding the trap in place beneath the roost out of the way of the poultry, but in position to receive and trap the insects.

In the accompanying drawings:

Fig. 1, is a view in side elevation of my improved roost, with parts broken out and one end in longitudinal section, Fig. 2, is a fragment of the roost in side elevation showing the trap in longitudinal section, Fig. 3, is a transverse section, Fig. 4, is a view in perspective of the trap and cover, Fig. 5, is a side view of the fastener, and Fig. 6, is a plan view of the fastener.

A is the roost made of any suitable material, such as wood, of suitable dimensions adapted to stretch across or throughout the length of the hen-house, and 1, are hooks at the ends for detachably securing the roost in place. These hooks have holes 2, by which they may be secured, or bolted down, if desired.

Between the hooks and the roost, felt or other wicking 3 is secured. This is preferably doubled and lines the entire portion of the hook which would otherwise come in contact with the under and lower surface of the roost. This felt is adapted to be saturated with kerosene or other substance for preventing the escape of the vermin from the roost.

The numeral 4 represents the trap. There may be any number of these, according to the length of the roost. Two are shown. These are preferably made of blocks of wood grooved out in the form of a trough throughout the major portion of their length as at 5, and preferably only slightly grooved as at 6, at the ends, allowing space for the vermin to crawl in at the top and accumulate in the deeper portion of the groove.

A transparent cover 7 of celluloid is removably placed over the trap and rests between the trap and the lower surface of the roost, the function of the celluloid cover being that it permits inspection of the contents of the trap without otherwise having to open it, so that the attendant can determine at a glance upon removing the trap as to whether or not any vermin has accumulated in it.

While any form of fastener might be employed, the particular one I have designed is made of a single piece of wire 9, which is pivotally held by a staple 10 to the side of the roost, and the center 11 of which crosses over under the roost to the other side in position to engage beneath and frictionally hold the trap in place, while the free end 12 is adapted to extend in the opposite direction upon the other side of the roost, and be sprung over a stud 13, where it is held securely in place and the trap is held firmly beneath the lower surface of the roost.

This particular mode of fastening is simple, inexpensive, easy to manipulate, and at the same time is most effectual in securing the trap rigidly but detachably in place beneath the roost, where it is out of the way of the poultry roosting thereon and in position to catch the vermin, which may be confined upon the roost as they attempt to crawl out of the way.

The trap is made of wood or other material that can be thrown into boiling water, and in this way thoroughly cleansed and the vermin destroyed.

In this way, I have provided a very simple and inexpensive roost, and one that provides an effectual means to trap and exterminate vermin.

I claim:

A device of the character described including a roost proper, a trap, a fastener for removably holding the trap in place against the roost, said fastener composed of a single piece of spring wire pivoted to the roost, extending laterally beneath the latter, and a stud over which the free end of the fastener is sprung whereby to hold the trap in place against the roost proper.

In testimony whereof I affix my signature.

JAMES O. SABIN.